United States Patent [19]

Dragone

[11] Patent Number: 5,002,350
[45] Date of Patent: Mar. 26, 1991

[54] OPTICAL MULTIPLEXER/DEMULTIPLEXER

[75] Inventor: Corrado Dragone, Little Silver, N.J.

[73] Assignee: AT&T Bell Laboratories, Murray Hill, N.J.

[21] Appl. No.: 485,014

[22] Filed: Feb. 26, 1990

[51] Int. Cl.⁵ .......................... G02B 6/26; H04J 14/00
[52] U.S. Cl. ............................ 350/96.15; 350/96.16; 350/96.24; 370/3; 370/4
[58] Field of Search ............... 350/96.15, 96.16, 96.20, 350/96.22, 96.24; 370/1, 2, 3, 4; 250/227.11

[56] References Cited

U.S. PATENT DOCUMENTS

| | | | |
|---|---|---|---|
| 3,849,604 | 11/1974 | Benes et al. | 370/4 X |
| 3,892,468 | 7/1975 | Duguay | 350/96.24 X |
| 3,925,727 | 12/1975 | Duguay | 350/96.24 X |
| 4,053,764 | 10/1977 | Sierak et al. | 350/96.15 X |
| 4,243,297 | 1/1981 | Elion | 350/96.15 |
| 4,296,319 | 10/1981 | Franks et al. | 350/96.15 X |
| 4,482,994 | 11/1984 | Ishikawa | 370/3 |
| 4,511,206 | 4/1985 | Thylen et al. | 350/96.11 |
| 4,522,461 | 6/1985 | Mannschke | 350/96.15 X |
| 4,650,279 | 3/2987 | Magee | 350/96.24 |
| 4,707,062 | 11/1987 | Abe et al. | 350/96.16 |
| 4,725,774 | 2/1988 | Davis et al. | 324/77 |
| 4,750,802 | 6/1988 | Bhagavatula | 350/96.15 |
| 4,786,131 | 11/1988 | Mahabatra et al. | 350/96.16 |
| 4,867,520 | 9/1989 | Weidel | 350/96.16 |
| 4,904,042 | 2/1990 | Dragone | 350/96.16 |

OTHER PUBLICATIONS

Boyd et al., "Optical Channel Waveguide Arrays ..." Optical Engineering May/Jun., 1980 vol. 19, No. 3, pp. 387-391.1
Lipson, et al., *Journal of Lightwave Technology*, vol. LT-3, No. 5, Oct. 1985, pp. 1159-1163.
H. Takahashi, et al., *Electronics Letters*, vol. 26, No. 2, Jan 18, 1990, pp. 87, 88.
Smit, *Electronic Letters*, 1988, vol,. 24, pp. 385-386.

*Primary Examiner*—Brian Healy

[57] ABSTRACT

This invention is an optical Multiplexer/Demultiplexer, built from a plurality of optical waveguides. Each waveguide differs in length from its neighboring waveguide by a predetermined amount. The waveguides are strongly coupled to one another at their respective ends, and substantially uncoupled therebetween, allowing for high efficiency.

16 Claims, 3 Drawing Sheets

OPTICAL MULTIPLEXER/DEMULTIPLEXER

BACKGROUND OF THE INVENTION

1. Field of the Invention

This invention relates to an optical diffractor, which in many embodiments, will be used as a multiplexer/demultiplexer.

2. Description of the Prior Art

Optical multiplexing and demultiplexing is normally accomplished by means of a dispersive element, such as a diffraction grating, prism, hologram, etc. One such optical multiplexer/demultiplexer is described in the article "A Six-Channel Wavelength Multiplexer and Demultiplexer For Single Mode Systems" by J. Lipson et al. in *Journal of Lightwave Technology*, Vol. LT-3, No. 5, Oct. 1985. In the Lipson article, a blazed diffraction grating is utilized for combining and separating various wavelengths of light. Demultiplexing is accomplished by transmitting the multiplexed signal through the grating, which separates the individual wavelengths of light and diffracts each in a slightly different direction. Multiplexing is accomplished by utilizing the same device in reverse; i.e., shining each wavelength through the grating at a predetermined wavelength dependent angle such that all the wavelengths emerge essentially as one single multiplexed beam of light.

This conventional grating, which has been widely utilized in optical communications systems, has several drawbacks. First, some of the incident power is usually lost, because a grating with a period less than half the wavelength of the incident light produces unwanted higher order modes in unwanted directions. Second, due to current manufacturing technology, gratings have limited resolution i.e., wavelengths within 5 Angstroms of each other will not normally be separated. Finally, the grating is typically combined with a lens or reflector to focus the light, and the lens or reflector is difficult to implement in integrated form using, for example, photolithographic techniques.

Several proposals have previously been made in an attempt to overcome the above problems. One optical multiplexer which overcomes the above problems to some extent is described in the article, "New Focusing and Dispersive Planar Component Based on an Optical Phased Array", by M. K. Smit, in *Electronic Letters*, 1988, Vol. 24, pp. 385-386. In the Smit article, a plurality of optical waveguides are utilized, each of a different length, to construct an optical phased array. The resulting structure acts as a high resolution optical multiplexer. However, due to the fact that there is essentially no mutual coupling among the waveguides, the structure is highly inefficient.

SUMMARY OF THE INVENTION

The foregoing problems in the prior art have been solved in accordance with the present invention which relates to a highly efficient optical multiplexer/demultiplexer constructed from a plurality of optical waveguides of various lengths. Each waveguide differs in length from its neighboring waveguide by a predetermined amount. The waveguides are substantially uncoupled throughout their entire lengths, except at their ends, where strong mutual coupling between the waveguides exists. The transition from the coupled portions to the uncoupled portions is gradual, resulting in negligible higher order mode generation. In one embodiment, this gradual coupling is implemented by an outward taper at the end of each waveguide.

DETAILED DESCRIPTION

Figure 1:
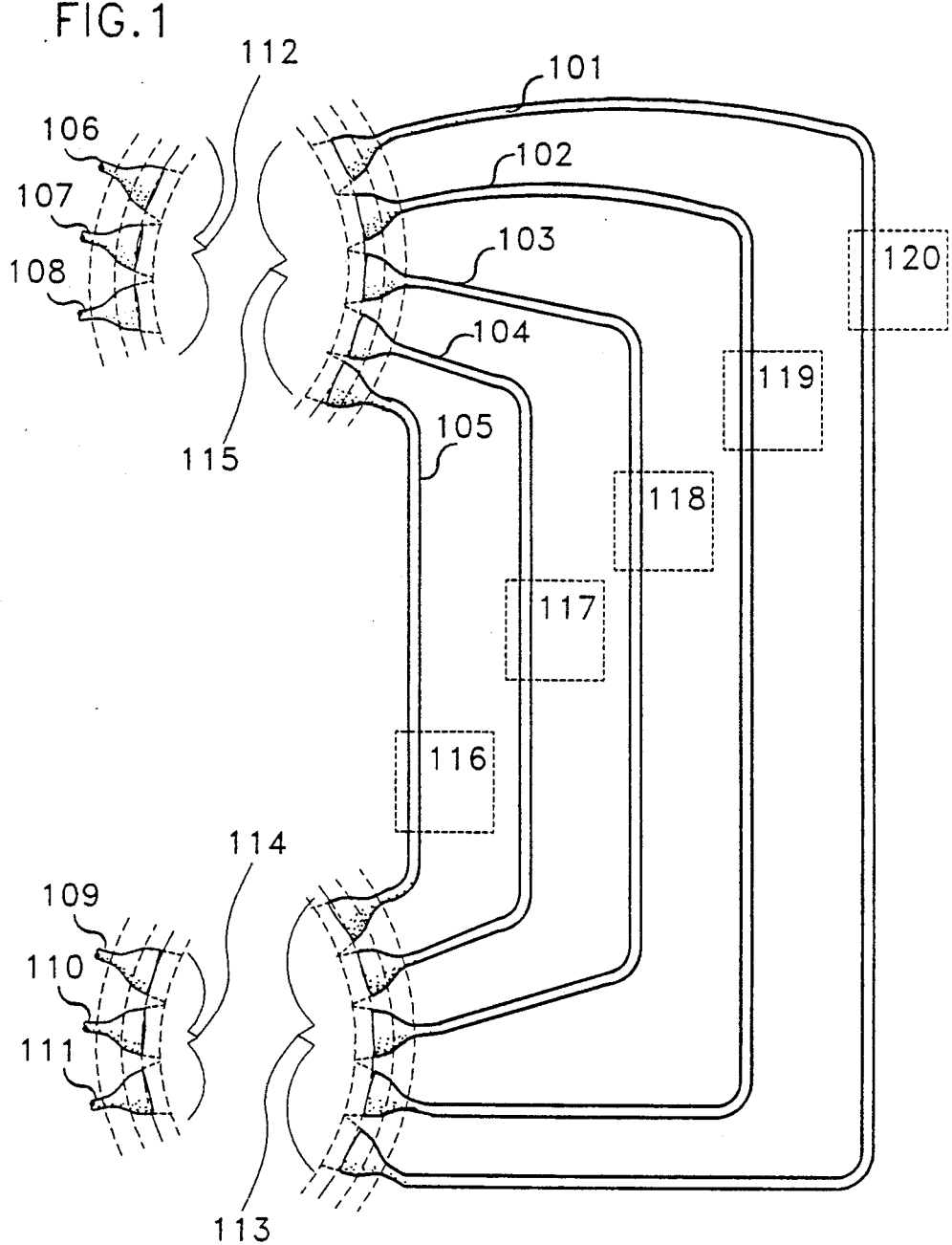
FIG. 1 shows an exemplary embodiment of the inventive multiplexer/demultiplexer.

FIG. 1 shows an exemplary embodiment of the invention comprising eleven waveguides 101-111, arranged into four waveguide arrays 112-115, each of which defines a substantially circular arc. The arc formed by waveguide array 112 is part of a circle which has its center along waveguide array 115. Further, the arc formed by waveguide array 115 is part of a circle which has its center along waveguide array 112. Waveguide arrays 113 and 114 are arranged similarly.

Figure 2:
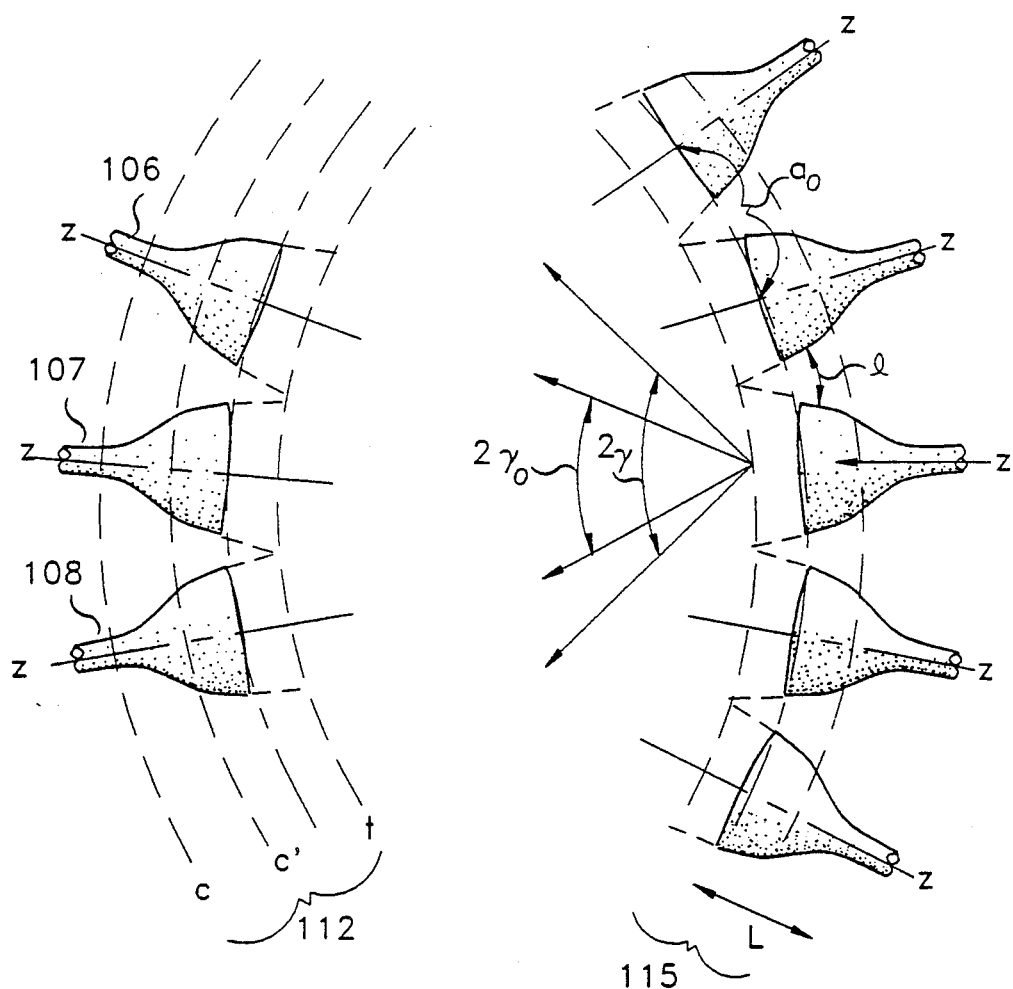
FIG. 2 shows an enlarged view of two exemplary waveguide arrays of FIG. 1.

Waveguide arrays 113 and 115 can only be used effectively within their respective Brillouin zones, whose width $2\gamma$ is specified by:

$$\sin\gamma = \frac{1}{2}\frac{\lambda}{a_0}. \tag{1}$$

where $a_0$ is the distance between waveguide centers at the larger opening of the waveguides as shown in FIG. 2 and $\lambda$ is the wavelength of the incident light. It should be noted that the multiplexer/demultiplexer will be utilized with differing wavelengths, and consequently, the width of the Brillioun zone will not be constant for all incident light.

Returning to FIG. 1, the waveguides 106-108 are arranged to occupy a predetermined fraction of the Brillouin zone of waveguide array 115. The fraction of the Brillouin zone occupied is denoted herein as the field of view, and has width $2\gamma_0$ as shown in FIG. 2. Waveguides 109-111 of FIG. 1 occupy the field of view of waveguide array 113.

For purposes of clarity, operation of the device will be first described as if only one of waveguides 106-108 of waveguide array 112 is excited. The use of the device as a multiplexer/demultiplexer will then be explained.

Waveguides 101-105 are each of a different length, and each differs in length from its adjacent waveguide by a fixed amount denoted l. Consider a wave of wavelength $\lambda_0$ emanating from waveguide 106 toward waveguides 101-105, where $\lambda_0$ and l are chosen such that l is an integer multiple of $\lambda_0$. Due to the difference in length from waveguide 106 to each of waveguides 101-105, the phase of the emanating wave as it is received by each of waveguides 101-105 will be different. More particularly, the wave will be received by waveguide 101 at some reference phase 0, while being received at waveguides 102, 103, 104 and 105 at phase $\phi$, $2\phi$, $3\phi$ and $4\phi$ respectively.

As the wave propagates along the tapered region of the waveguides of waveguide array 115, it is gradually transformed into five separate uncoupled waves, with such transformation causing near zero higher order mode generation. Each of the five uncoupled waves will then propagate along its respective waveguide until reaching waveguide array 113.

At waveguide array 113, the five waves are gradually coupled back into a single propagating wavefront, which emanates toward waveguide array 114. Since l is an integer multiple of $\lambda_0$, the constant phase difference $\phi$ between adjacent waveguides is preserved. Thus the wave emanating from each of the waveguides of waveguide array 113 is phase shifted by $\phi$ from the wave emanating from its neighboring waveguide.

The five waves will combine to produce a single wavefront which propagates in a direction that corresponds exactly to the direction along waveguide array 112 from which the wave was launched. More particularly, a wave launched from waveguide 106 will be directed by waveguide array 113 toward waveguide 109, since waveguides 106 and 109 are disposed in corresponding positions of their respective waveguide arrays 112 and 114. Similarly, waves which are launched from waveguides 107 or 108, will be directed by waveguide array 113 at waveguides 110 and 111, respectively. This is due to the fact that waveguides 107 and 110 are located in corresponding positions of their respective waveguide arrays 112 and 114, as are waveguides 108 and 111.

Note that as the waves propagate along their respective waveguides, the phase of the wave in any waveguide is substantially unaffected by the phase of the wave in any other waveguide. This is due to the lack of coupling of the waveguides throughout their lengths, which allows each wave to propagate independently. Further, if the wavelength of the incident light is not an integer multiple of the path length difference 1, this independent propagation allows the phase relationship among the five waves to change as the waves propagate through the waveguides. This property allows construction of a multiplexer/demultiplexer as described below.

Assume that l is not an integer multiple of the wavelength. In this case, energy launched from one of waveguides 106-108 of waveguide array 112 will not be directed by waveguide array 113 toward the corresponding waveguide along waveguide array 114. A wave launched from waveguide 106, for example, would not be directed by waveguide array 113 towards waveguide 110 of waveguide array 114, even though waveguide 110 and waveguide 106 are in corresponding positions of their respective waveguide arrays 112 and 114. Rather, the direction of the wave when it emanates from waveguide array 114 will be displaced laterally by some predetermined amount D. The amount of displacement D, is a function of the wavelength of the wave and is specified by $$D = \frac{R}{a_0} \frac{\lambda - \lambda_0}{\lambda_0} 1 \qquad (2)$$

where R is the radius of the arc defined by waveguides 101-105, $\lambda_0$ is the nearest wavelength to $\lambda$ such that l is an integer multiple of $\lambda_0$, and l and $a_0$ are as previously defined.

Thus, it can be seen that if a wave comprising a plurality of wavelengths is launched from waveguide 106, each of the wavelengths will emanate in a different direction from waveguide array 113. This property can be utilized to build a demultiplexer. More particularly, consider a wave comprising wavelengths $\lambda_1$, $\lambda_2$, and $\lambda_3$ launched from waveguide 106, for example, toward waveguide array 115 of FIG. 1. Equation 2 can be utilized to arrange waveguide array 114 such that each of the wavelengths $\lambda_1$, $\lambda_2$, and $\lambda_3$ is directed toward a separate one of waveguides 109-111. This can be done by calculating D for each wavelength and positioning waveguides 109-111 accordingly. Further, if each of the waveguides 106-108 is excited with a different wavelength, the different wavelengths can be selected so that they all emanate into the same one of waveguides 109-111.

Having established basic principles of operation it may be desired to improve the efficiency of the multiplexer/demultiplexer. In order for the efficiency to be close to unity, the receiving waveguides must almost touch each other, so that essentially the entire incident power is collected. Thus, the initial separation l in FIG. 2 must be very small. In order for the power received by waveguide array 115 to be transferred efficiently to waveguide array 113, the waveguides in waveguide array 115 must include a transition in which the separation l between waveguides gradually increases. If the field of view $\gamma_0$ is appreciably smaller than $\gamma$, for instance, $$|\gamma_0| < 0.5\gamma \qquad (3)$$

then efficiencies close to unity will be obtained by simply using a linear transition, characterized by a linear variation of l, with $$L > 60 \frac{a_0}{\lambda} \qquad (4)$$

where L is the length of the transition. For some applications, however, the required field of view may exceed $0.5\gamma$. Then, the above length must be increased, and the required increase can be calculated by means of the standard design formulae of waveguide tapers. In order to obtain, for instance, efficiencies exceeding 90 percent for $|\gamma_0| > 0.75\gamma$, one must choose $$L > 200 \frac{a_0}{\lambda}.$$

Much larger L will be required for $|\gamma_0|$ much closer to $\gamma$. It will then become important to use, instead of a linear taper, a more efficient taper which can be designed as follows.

FIG. 2 shows an enlarged view of waveguide arrays 112 and 115 of FIG. 1. The parameters c, c', a and t will be described hereafter. The larger openings of the waveguides define an arc on a circle. The longitudinal axes of the waveguides intersect at the center of the circle.

Figure 3:
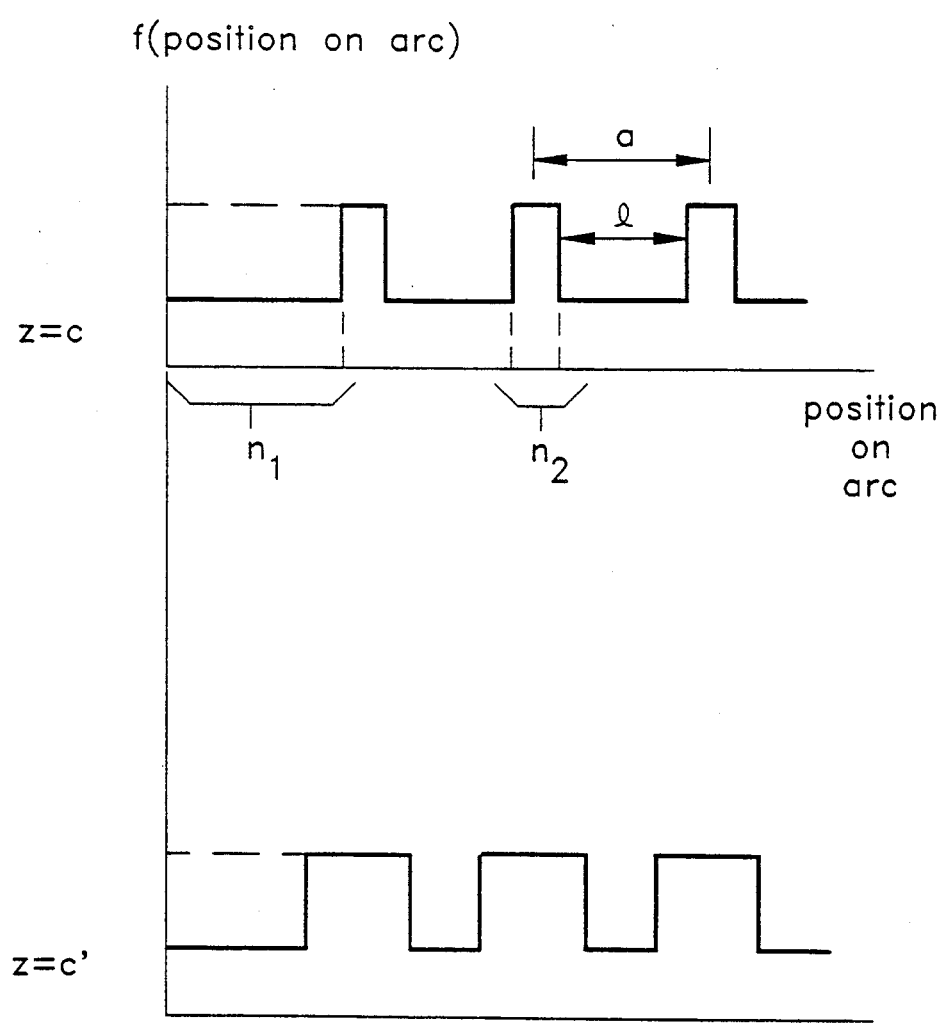
FIG. 3 shows two refractive profiles, defined in more detail hereafter.

FIG. 3 shows a plot of $$n^2 a^2 \left[ 2 \frac{\pi}{\lambda} \right]^2 \qquad (5)$$

as a function of the position along a cross section of FIG. 2, where n is the index of refraction at the particular point in question, $\lambda$ is a wavelength of the light being used to excite the waveguide array, and a is the distance between waveguide centers. Traversing the horizontal axes labeled z=c and z=c' in FIG. 3 is equivalent to traversing the arcs c and c', respectively, of FIG. 2. For purposes of explanation, equation 5, plotted for any circular cross-section of FIG. 2 such as those labeled c and c', is referred to herein as a refractive profile.

Everything in equation 5 is constant for a given refractive profile, except for n, which will oscillate up and down as the waveguides are entered and exited respectively. Thus, each plot is a periodic square wave with amplitude proportional to the square of the index of refraction at the particular point in question along an arc.

Note that once the diameter of the arc formed by each waveguide array is determined, specifying the refractive profiles at closely spaced intervals along the longitudinal axes of the waveguides will uniquely determine the taper shown at the end of each waveguide in FIG. 2. The closer the intervals, the more accurate the design of the taper. Specifying this taper correctly will maximize the efficiency of the waveguide array by reducing the amount of energy in unwanted higher order modes.

The correct property to be satisfied by each refractive profile is that its first order Fourier coefficient, denoted V, should essentially satisfy the condition $$V = 2\pi^2 \left[ \frac{\sin\gamma - \sin\theta_B}{\sin\gamma} \right] \left[ \frac{p(y)}{\sqrt{1 - p^2(y)}} \right] \quad (6)$$

where $\theta_B$ is an arbitrary angle within the central Brillouin zone, $$p(y) = 3 \frac{y}{2} (1 - \tfrac{1}{3}y^2),$$

$$y = F_r \left( \frac{|z|}{L} \right) + F_t,$$

L is equal to the length of the tapered region excluding the dashed portion as shown in FIG. 2, $F_r$ and $F_t$ are the fractions of the waveguide remaining and truncated, respectively, and $|z|$ is the distance from the wider end of the waveguide to the point where the refractive profile intersects the longitudinal axis of the waveguide. The length of the waveguide before truncation would include the dashed portion of each waveguide, shown in FIG. 2. This can be calculated easily since, at the point when the waveguides are tangent, (z=t in FIG. 2), V will equal 0 as the plot $n^2 a^2$ $$\left[ \frac{2\pi}{\lambda} \right]^2$$

is a constant. Thus, by finding the point z=t along a z axis such that V=0, one can determine the length before truncation. The length after truncation will be discussed later herein, however, for purposes of the present discussion, $F_t$ can be assumed zero, corresponding to an untruncated waveguide. It can be verified that for an arrangement such as that of FIG. 2, $$V = \frac{(n_1 + n_2)(n_1 - n_2)}{4\pi} k^2 a^2 \sin\left( \frac{l\pi}{a} \right) \quad (7)$$

where $n_1$ and $n_2$ are the refractive indices inside and between the waveguides respectively, and $$k = \frac{2\pi}{\lambda}.$$

Thus, from equations 6 and 7:

$$\left[ \frac{\sin\gamma - \sin\theta_B}{\sin\gamma} \right] \left[ \frac{p(y)}{\sqrt{1 - p^2(y)}} \right] = \quad (8)$$

$$\frac{(n_1 + n_2)(n_1 - n_2)}{4\pi} k^2 a^2 \sin\left( \frac{l\pi}{a} \right)$$

Thus, after specifying $\theta_B$ and assuming $F_t$ equals zero, equation 8 can be used to specify l at various points along the z axes and thereby define the taper of the waveguides.

Throughout the above discussion $\gamma_0$, $\theta_B$, and $F_t$ were assumed to be design parameters which were selected independently. In actuality, these three parameters interact in a complex manner to influence the performance of the multiplexer/demultiplexer. The following discussion is provided to clarify the interaction of $\gamma_0$, $\theta_B$, and $F_t$.

One figure of merit M for a waveguide array which emanates towards a second waveguide array, is described by the following equation:

$$M = N^2(\gamma_0) \frac{\sin\gamma_0}{\sin\gamma} \quad (9)$$

where $N(\theta)$ is calculated by using the following set of equations:

$$v = \int_0^z (B_0 - B_1)dz \quad (10)$$

$$\tau = \int_0^{v_L} t \exp(jv)dv \quad (11)$$

$$t = \frac{a^2}{2} \frac{B_0(\sin\gamma)^2}{4\pi^4(\sin\gamma - \sin\theta)^2} \frac{dV(z)}{dz} \frac{1}{(1 + u^2)^{3/2}} \quad (12)$$

where $$u = \frac{\sin\gamma}{2\pi^2 [\sin\gamma - \sin\theta]} [V(z)] \quad (13)$$

$$N(\theta) = \frac{1}{1 + |\tau|^2} \quad (14)$$

In the above equations $B_0$ and $B_1$ represent the propagation constant, of the fundamental mode and first higher order mode, respectively, of the waveguides, $v_L$ is equal to equation 10 evaluated at z=L, and $\theta$ is any angle less than or equal to $\gamma_0$. In practice, $\theta$ should be set to $\gamma_0$, since this case represents the worst case performance within the field of view.

To maximize M the procedure is as follows: assume $F_t=0$, choose an arbitrary $\theta_B$, and calculate N using equations 6 and 10-14 with $\theta$ equal to $\gamma_0$ for all angles $\gamma_0$ within the central Brillouin zone. Having obtained these values of $N(\gamma_0)$, determine which $\gamma_0$ maximizes M. This gives the maximum M for a given $F_t$ and a given $\theta_B$. Next, keeping $F_t$ equal to 0, iterate the above process using all $\theta_B$s. This gives the maximum M for a given $F_t$ over all $\theta_B$s. Finally, iterate the entire process with various $F_t$s until the maximum M is achieved over all $\theta_B$s and $F_t$s. This can be carried out using a computer program.

It is to be understood that the above described example is for illustrative purposes only and that other variations are possible without violating the scope and spirit of the invention. For example, optional delay elements 116–120 could be inserted into the waveguides, as shown in the dashed outline in FIG. 1. The delay elements, which alter the effective length of the waveguide, could be used either in addition to or instead of the physical length differences in the waveguides. For purposes of explanation herein, the length of a waveguide includes any apparent additional length caused by the delay elements. Finally, the delay elements allow external control of the lengths by means of a control signal.

The device can be utilized as a switch rather than a multiplexer/demultiplexer. More particularly, the input to any waveguide can be shifted in wavelength to correspond to a desired output waveguide toward which it is desired to emanate the wave. The device can be fabricated on a single chip, using photolithographic techniques which are well-known in the art.

I claim:

1. An optical multiplexer/demultiplexer comprising:
a plurality of N optical waveguides, each waveguide including a first end for receiving optical energy and a second end for transmitting optical energy,
each waveguide further being of a predetermined different length substantially equal to $I+nl$, where I is a predetermined initial length, n is an integer such that $0 \leq n \leq N-1$, and l is a predetermined value greater than zero, the waveguides being substantially coupled to each other at their respective first ends, and at their respective second ends, and substantially uncoupled therebetween such that a single wavefront of optical energy incident upon the first ends is transformed within the waveguides to a plurality of substantially uncoupled propagating waves, and the plurality of uncoupled propagating waves is transformed into substantially a single propagating wavefront before reaching the second ends.

2. The optical multiplexer/demultiplexer of claim 1 wherein the first ends of each waveguide are arranged into a first waveguide array to substantially define a first arc, and wherein the second ends of the waveguides are arranged into a second waveguide array, to substantially define a second arc.

3. The optical multiplexer/demultiplexer of claim 2 wherein the first end and the second end of each waveguide includes a tapered portion.

4. The optical multiplexer/demultiplexer of claim 3 wherein the tapered portion includes a first end and a second end and wherein at least one of said arrays includes a series of refractive profiles, thereby defining the shape of the taper, each refractive profile comprising a first order Fourier coefficient, each first order Fourier coefficient substantially equal to:

$$V = 2\pi^2 \left[ \frac{\sin\gamma - \sin\theta_B}{\sin\gamma} \right] \left[ \frac{p(y)}{\sqrt{1-p^2(y)}} \right]$$

where $2\gamma$ is an angle defining a central Brillouin zone associated with the array, $\theta_B$ is an arbitrary angle less than or equal to $\gamma$, p(y) is substantially equal to $$3\frac{y}{2}(1 - \tfrac{1}{3}y^2), \text{ and } y = F_r\left(\frac{|z|}{L}\right) + F_t$$

z is a distance from the second end of the waveguides to the refractive profile, $$F_t = \frac{L+b}{L},$$

b is a distance which an outer surface of each waveguide would have to be extended from the second end to become tangent to an adjacent waveguide, and $F_r = 1 - F_t$.

5. The optical multiplexer/demultiplexer of claim 4 wherein at least one of said waveguides comprises a delay element for increasing its path length.

6. The optical multiplexer/demultiplexer of claim 5 further comprising
an input array, including:
a plurality of waveguides, each including a first end for receiving optical energy, and a second end for launching the optical energy, said second ends being arranged to substantially define a third arc, said third arc defining a portion of a circle which is centered along said first arc.

7. An optical multiplexer/demultiplexer of claim 6 further comprising
an output array, including:
a plurality of waveguides, each including a first end for receiving optical energy, and a second end for launching the optical energy, said second ends being arranged to substantially define a fourth arc, said fourth arc defining a portion of a circle which is centered along said second arc.

8. An optical multiplexer/demultiplexer comprising:
a plurality of optical waveguides, each having a first end for receiving optical energy and a second end for launching the optical energy, and a predetermined length,
means for injecting optical energy into the first ends, and
a plurality of receivers, each for receiving optical energy which emanates from the second ends, wherein the length of each waveguide is such that optical energy emanates from the second ends at a predetermined angle that varies with wavelength,
each of the receivers is associated with a predetermined wavelength and is positioned at the predetermined angle relative to the second ends of the waveguides, such that substantially all optical energy emanated from the second ends of the optical waveguides in a predetermined frequency band centered at the associated wavelength emanates at the predetermined angle, and
the waveguides are substantially coupled at their first ends and at their second ends, and substantially uncoupled therebetween such that a single wavefront of optical energy incident upon the first ends is transformed within the waveguides to a plurality of substantially uncoupled propagating waves, and the plurality of uncoupled propagating waves is transformed into substantially a single propagating wavefront before reaching the second ends.

9. The optical multiplexer/demultiplexer of claim 8 wherein the first ends of the waveguides are arranged into a first waveguide array to substantially define a first arc, and wherein the second ends of the waveguides are arranged into a second waveguide array, to substantially define a second arc.

10. The optical multiplexer/demultiplexer of claim 9 wherein each of the waveguides in at least one of said arrays includes a predetermined tapered portion, the tapered portion having a first end and a second end and wherein the at least one of said arrays includes a series of refractive profiles, thereby defining the shape of the taper each refractive profile comprising a first order Fourier coefficient, each first order Fourier coefficient substantially equal to:

$$V = 2\pi^2 \left[ \frac{\sin\gamma - \sin\theta_B}{\sin\gamma} \right] \left[ \frac{p(y)}{\sqrt{1 - p^2(y)}} \right]$$

where $2\gamma$ is an angle defining a central Brillioun zone associated with the array, $\theta_B$ is an arbitrary angle less than or equal to $\gamma$, p(y) is substantially equal to $$3 \frac{y}{2} (1 - \tfrac{1}{3}y^2), \text{ and } y = F_r \left( \frac{|z|}{L} \right) + F_t$$

z is a distance from the second end of the waveguides to the refractive profile, $$F_t = \frac{L + b}{L},$$

b is a distance which an outer surface of each waveguide would have to be extended from the second end to become tangent to an adjacent waveguide, and $F_r = 1 - F_t$.

11. The optical multiplexer/demultiplexer of claim 10 wherein at least one of said waveguides comprises a delay element for increasing its path length.

12. The optical multiplexer/demultiplexer of claim 11 further comprising
an input array, including:
a plurality of waveguides, each including a first end for receiving optical energy, and a second end for launching the optical energy, said second ends being arranged to substantially define a third arc, said third arc defining a portion of a circle which is centered along said first arc.

13. An optical multiplexer/demultiplexer of claim 12 further comprising
an output array, including:
a plurality of waveguides, each including a first end for receiving optical energy, and a second end for launching the optical energy, said second ends being arranged to substantially define a fourth arc, said fourth arc defining a portion of a circle which is centered along said second arc.

14. An optical multiplexer/demultiplexer according to claim 13 wherein at least one of said waveguides comprises a delay element for increasing its path length.

15. An optical multiplexing arrangement according to claim 14 further comprising
an input array, including:
a plurality of waveguides, each including a first end for receiving optical energy, and a second end for launching the optical energy, said second ends being arranged to substantially define a third arc, said third arc defining a portion of a circle which is centered along said first arc.

16. An optical multiplexing arrangement according to claim 15 further comprising
an output array, including:
a plurality of waveguides, each including a first end for receiving optical energy, and a second end for launching the optical energy, said second ends being arranged to substantially define a fourth arc, said fourth arc defining a portion of a circle which is centered along said second arc.

* * * * *